(12) United States Patent
Courcier

(10) Patent No.: US 10,697,601 B2
(45) Date of Patent: Jun. 30, 2020

(54) LIGHTING MODULE FOR A MOTOR VEHICLE

(71) Applicant: Valeo Vision, Bobigny (FR)

(72) Inventor: Marine Courcier, Paris (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 15/313,223

(22) PCT Filed: Jul. 7, 2015

(86) PCT No.: PCT/EP2015/065521
§ 371 (c)(1),
(2) Date: Nov. 22, 2016

(87) PCT Pub. No.: WO2016/005409
PCT Pub. Date: Jan. 14, 2016

(65) Prior Publication Data
US 2017/0184267 A1    Jun. 29, 2017

(30) Foreign Application Priority Data

Jul. 11, 2014  (FR) ...................... 14 56728

(51) Int. Cl.
*F21S 41/147* (2018.01)
*F21S 41/24* (2018.01)
(Continued)

(52) U.S. Cl.
CPC .......... *F21S 41/147* (2018.01); *F21S 41/143* (2018.01); *F21S 41/24* (2018.01); *F21S 41/27* (2018.01); *F21S 41/321* (2018.01); *F21S 41/663* (2018.01); *G02B 6/0055* (2013.01); *G02B 6/0065* (2013.01); *F21Y 2115/30* (2016.08)

(58) Field of Classification Search
CPC ............ F21V 5/04–048; F21V 7/04–09; F21S 48/1225; F21S 41/147; F21S 41/24; F21S 41/663; F21S 41/27; F21S 41/143; F21S 41/321; F21S 41/322
See application file for complete search history.

(56) References Cited

U.S. PATENT DOCUMENTS 6,831,886 B1 * 12/2004 Yamasaki ............ G11B 7/1359
                                                    369/112.27
7,207,705 B2    4/2007 Ishida
(Continued)

FOREIGN PATENT DOCUMENTS

EP    2045515 A1    4/2009
EP    2280215 A2    2/2011
EP    2743567 A1    6/2014

*Primary Examiner* — Mariceli Santiago
(74) *Attorney, Agent, or Firm* — Oblon, McClelland, Maier & Neustadt, L.L.P.

(57) ABSTRACT

A luminous module for an automotive vehicle, including at least one light source each associated with a light-entrance member of a primary optical component that is placed facing a projecting secondary optical component formed by a mirror. The module has three surfaces for treating the geometric aberration of the light rays, two of which are borne by the primary optical component. The exit face of the light-entrance member is placed in a plane coincident with an object focal plane of the projecting system formed by the primary and secondary optical components.

19 Claims, 1 Drawing Sheet

(51) Int. Cl.
  *F21S 41/27* (2018.01)
  *F21S 41/143* (2018.01)
  *F21S 41/32* (2018.01)
  *F21S 41/663* (2018.01)
  *F21V 8/00* (2006.01)
  *F21Y 115/30* (2016.01)

(56) References Cited

U.S. PATENT DOCUMENTS

| | | | |
|---|---|---|---|
| 7,513,642 B2 | 4/2009 | Sormani | |
| 7,513,654 B2 | 4/2009 | Okada | |
| 8,920,006 B2 | 12/2014 | de Lamberterie | |
| 9,316,376 B2* | 4/2016 | Orisich | F21S 48/225 |
| 2006/0087860 A1 | 4/2006 | Ishida | |
| 2006/0285347 A1 | 12/2006 | Okada | |
| 2007/0211487 A1 | 9/2007 | Sormani | |
| 2008/0259620 A1* | 10/2008 | Oba | F21S 48/2237 |
| | | | 362/487 |
| 2009/0091944 A1 | 4/2009 | de Lamberterie | |
| 2012/0120676 A1* | 5/2012 | Richardson | G02B 6/0045 |
| | | | 362/555 |
| 2012/0176809 A1* | 7/2012 | Ohno | F21S 41/322 |
| | | | 362/510 |
| 2012/0287668 A1* | 11/2012 | Richardson | F21V 29/00 |
| | | | 362/602 |
| 2014/0003071 A1* | 1/2014 | de Lamberterie | F21S 48/24 |
| | | | 362/487 |
| 2014/0362596 A1* | 12/2014 | Nakaya | F21S 48/1241 |
| | | | 362/511 |
| 2016/0053967 A1* | 2/2016 | Owada | F21V 7/0091 |
| | | | 362/520 |

* cited by examiner

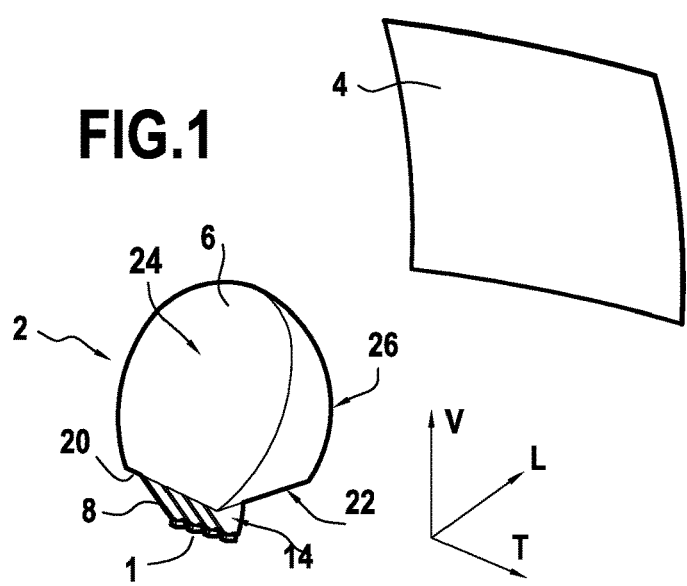
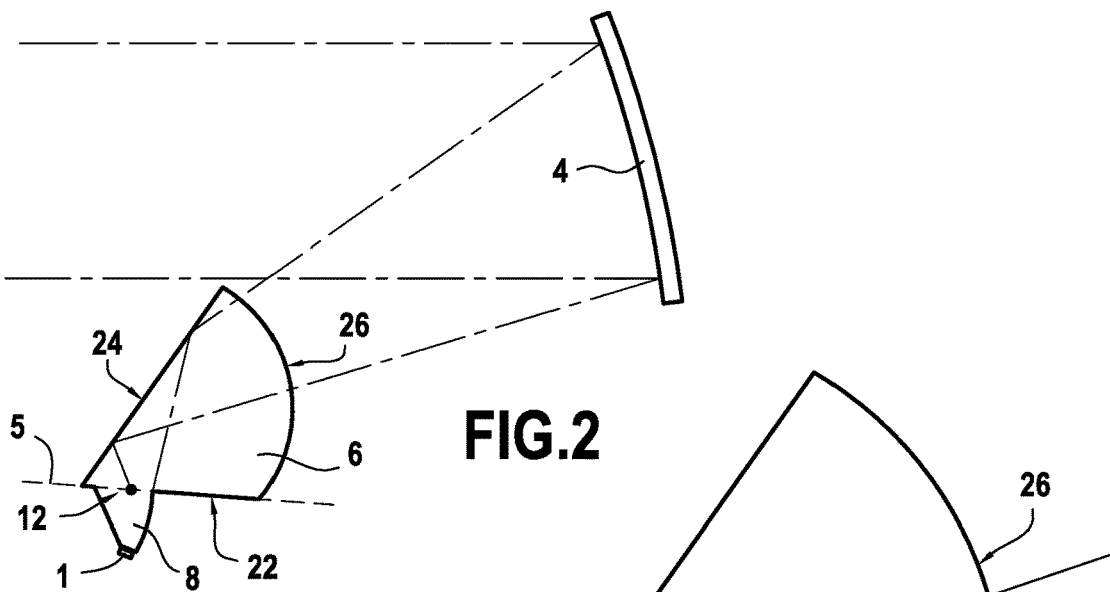
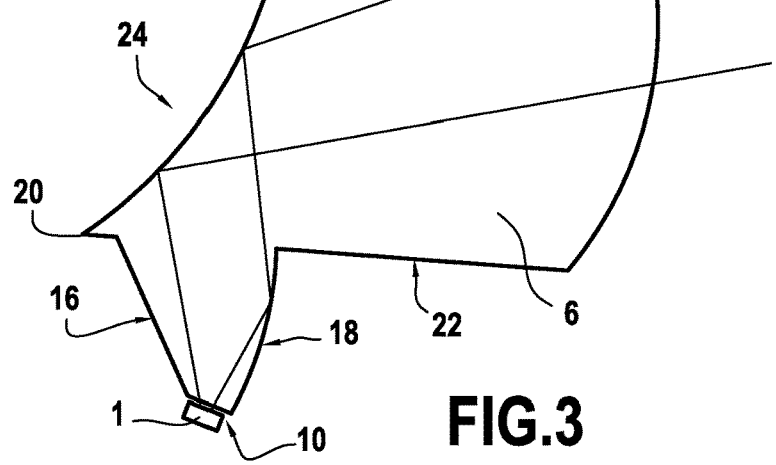

LIGHTING MODULE FOR A MOTOR VEHICLE

CROSS-REFERENCE TO RELATED APPLICATIONS

This application is the U.S. National Phase application of PCT Application No. PCT/EP2015/065521 filed Jul. 7, 2015, which claims priority to the French application 1456728 filed on Jul. 11, 2014, which applications are incorporated herein by reference and made a part hereof.

BACKGROUND OF THE INVENTION

1. Field of the Invention

The technical field of the invention is that of lighting modules for automotive vehicles.

An automotive vehicle is equipped with headlamps, or headlights, intended to illuminate the road in front of the vehicle, at night or in case of low luminosity. These headlamps may generally be used in two lighting modes: a first "high-beam" mode and a second "low-beam" mode. The "high-beam" mode allows the road far in front of the vehicle to be brightly lit. The "low-beam" mode provides a more limited illumination of the road, but nevertheless provides good visibility, without dazzling other road users. These two lighting modes are complementary. The driver of the vehicle must manually change mode depending on the circumstances, at the risk of inadvertently dazzling another road user. In practice, the fact that the lighting mode is changed manually may lack reliability and sometimes proves to be dangerous. Furthermore, the low-beam mode procures a sometimes unsatisfactory visibility for the driver of the vehicle.

2. Description of the Related Art

To improve this situation, headlamps equipped with an adaptive lighting function (known in particular by the acronym AFS for Adaptive Front-lighting System) have been proposed. Such an adaptive lighting function is intended to automatically detect, for example by processing images acquired by an on-board video camera, a road user liable to be dazzled by a lighting beam emitted in high-beam mode by a headlamp, and to modify the outline of this lighting beam so as to create a shadow zone in the location in which the detected user is found. The advantages of such an adaptive lighting function are multiple: comfort of use, better visibility with respect to a low-beam lighting mode, better reliability as regards the mode change, risk of dazzle greatly reduced, and safer driving.

Document EP2280215 describes an exemplary automotive-vehicle-headlamp lighting system equipped with an adaptive lighting function. The system comprises four primary optical modules, in each of which three light sources are associated with three respective light guides, and four projecting secondary optical components, in this case lenses, respectively associated with the four primary optical modules. The light emitted by each light source penetrates into the associated light guide and exits via an exit end of the guide, of rectangular shape. The arrangement of the optical modules and their associated secondary optical component means that the light emitted by each optical-guide exit end is projected by the secondary optical component so as to form in front of the vehicle a vertical luminous segment. The luminous segments produced partially superpose in the horizontal direction. The actuation of the light sources, which may be turned on independently of each other, is then controlled selectively to obtain the desired lighting.

The beam is thus divided into a plurality of luminous segments that it is possible to activate or deactivate. The adaptive lighting beam that it is thus possible to produce only by electronically controlling the turn-on of the light sources, and without mechanical movement of an additional shielding part, is known as a matrix beam.

Moreover, in the field of lighting, automotive manufacturers may seek to replace a lens with a mirror to answer questions of style, chromatism or indeed cost. However, this generates a problem with luminous efficacy, i.e. the optical flux output from the system is less than the flux at the source, because the reflectivity of a mirror (85% for an aluminum coating) is in general worse than the transmission of a lens.

Likewise, imaging is in general worse because when a mirror is substituted for a lens, the number of optical surfaces is reduced from two to only one, thereby leaving fewer variables for the correction of optical aberrations.

In addition, in a mirror-based system, the shift of the optical axis means that the light sources must have larger aperture angles if a good efficacy is to be preserved, thereby generating more optical aberrations.

SUMMARY OF THE INVENTION

It will be understood that the use of a reflector is a priori unfavorable for a matrix beam system, in which it is sought to produce various luminous segments having a well-controlled sharpness and shape and in which it is therefore necessary to seek to decrease optical aberrations.

This is the context of the present invention and its objective is to provide a mirror-based lighting module or luminous module that allows what are called matrix-beam luminous beams providing a good photometric performance and a good imaging performance to be formed, and that easily integrates into an automotive vehicle lighting device.

For this purpose, the invention proposes a primary optical component for an automotive-vehicle lighting module, comprising at least one light-entrance member having an entrance face through which light rays enter, and wherein the light-entrance member is joined to a corrective portion having an exit face through which light rays exit, the light-entrance member and the corrective portion forming an integral structure. Thus, it may be observed that the entrance face of the light-entrance member forms an entrance face of the primary optical component and the exit face of the corrective portion forms an exit face of the primary optical component. The corrective portion is bounded by at least three surfaces including an admission surface through which the light-entrance member opens onto the corrective portion via a zone of junction, at least one intermediate surface and an exit surface, the exit surface forming the exit face of the corrective portion and the intermediate surface forming a reflective surface arranged to reflect rays issued from the light-entrance member toward the convex surface. The zone of junction will in particular possibly be rectangular in shape.

By virtue of the invention, light rays emitted by a light source arranged in the vicinity of the entrance face and that penetrate into the primary optical component via this entrance face propagate through the primary optical component by total internal reflection, in particular from the intermediate surface.

The light-entrance member is arranged to form from this light source a virtual secondary source in the zone of junction.

The geometric aberrations of the rays issued from this secondary source are partially corrected by the intermediate surface so that these rays, when they are projected onto the road, for example by a projecting secondary optical component, form a corrected image of the secondary source.

According to one feature of the invention, the corrective portion is arranged so According to one feature of the invention, the corrective portion is arranged so as to correct the geometric aberrations of the light rays issued from the light-entrance member. In particular, the intermediate surface has a profile arranged to reflect the light rays by total internal reflection so as to treat geometric aberrations.

According to one feature of the invention, the zone of junction of the light-entrance member is oriented towards the intermediate surface. Thus, all of the rays issued from the light-entrance member are targeted on the intermediate surface directly with no intervening obstacle on their path, so that the intermediate surface is able to play its role as total-reflection surface fully.

The exit surface of the corrective portion may have a convex shape.

It may also have a shape that is spherical on the whole and the center of which is located outside of the corrective portion. For example, the corrective portion may have the shape of a ball truncated by two sectioning surfaces that intersect to form a common edge located inside the ball, and, in this case, the truncated portions of the ball form the admission and intermediate surfaces. Advantageously, the corrective portion forms another additional surface for treating geometric aberrations by refraction. Preferably, the center of the spherical surface of the corrective portion is in the vicinity of the image of the center of the zone of junction of the light-entrance member with the admission surface by the intermediate surface. By vicinity, what is meant is a distance smaller than 5 mm. The center of the ball is located outside the corrective portion. Thus, rays exiting from the light-entrance member substantially at the center of the sphere enveloping the corrective portion are normal to the exit face thereof and are therefore not deviated at the interface between the corrective portion and the surrounding air. Rays exiting off-center from the light-entrance member are for their part slightly deviated at the exit interface.

The intermediate surface has a curved shape, especially a curved shape that is curved toward the interior of the corrective portion, and it may in this case have a polynomial profile. Its characteristic equation is of polynomial form and calculated so that each ray arrives with a sufficient angle of incidence to be totally reflected.

By way of example, the equation of the surface may be:

$$z = -84.715\left(\frac{x}{100}\right)^2 + 14.211\left(\frac{y}{100}\right)^2 +$$
$$1324.046\left(\frac{x}{100}\right)^2\left(\frac{y}{100}\right) + 11.714\left(\frac{y}{100}\right)^3 + 2347.586\left(\frac{x}{100}\right)^4 -$$
$$3535.841\left(\frac{x}{100}\right)^2\left(\frac{y}{100}\right)^2 - 151.502\left(\frac{y}{100}\right)^4$$

Provision may also be made for the intermediate surface to be planar.

According to other features of the invention, which features may be implemented alone or in combination, the intermediate surface and the zone of junction are inclined one with respect to the other especially by an angle of about 45°, and the respective refractive indices of the light-entrance member and the corrective portion are substantially identical. The expression "substantially identical" is intended to be understood to mean refractive indices that are equal to within one hundredth. Thus, at the exit of the light-entrance member, the rays undergo no or almost no refraction. In one particular embodiment, the light-entrance member and the corrective portion are manufactured from the same material, and especially from the same polymer. The expression "same material" is meant to be understood to mean that the light-entrance member and the corrective portion are produced from materials at least produced from the same base polymer, PMMA for example. However, these materials may contain different additives.

According to one feature of the invention, the admission surface is planar at least in the zone of junction. As a variant, the admission surface may be curved at least in the zone of junction.

The light-entrance member may be formed by a micro lens. It may also, such as will be described below, consist of a light guide forming the light-entrance member, one of the upper or lower faces of the light guide having the shape of a portion of a cylinder. It is thus a total-internal-reflection face of the light guide. The light guide comprises at least one spreading face. The expression "spreading face" will be understood to mean a face shaped so as to enlarge the transverse cross section of the light guide from its entrance face to the junction with the corrective portion. The spreading face may for example be the face opposite the face having the shape of a portion of a cylinder.

The primary optical component advantageously includes a plurality of, especially four, light guides each forming a light-entrance member, the light guides being integrally formed with the corrective portion on the admission surface. In this case, it is worth noting that one of the end guides of the plurality of guides has a spreading lateral face, all the other guides having planar lateral faces. The guides may be juxtaposed so as to form a row.

The invention furthermore relates to a luminous module for an automotive vehicle, wherein provision is made for a primary optical component such as described above, and at least one light source associated with the light-entrance member of the primary optical component. The light source may for example be a light-emitting diode, or a laser diode.

According to various features of the invention, which features may be implemented alone or in combination:

a provision is made for a plurality of light sources each associated with the primary optical component; in this case, the primary optical component may include a plurality of light-entrance members, each light source being associated with one of the light-entrance members; as a variant, the primary optical component may include a single light-entrance member, each source being associated with this light-entrance member;

the primary optical component is placed facing a projecting secondary optical component, the zone of junction of the light-entrance member with the admission surface being coincident with a planar or curved object focal surface of the projecting system formed by the primary and secondary optical components; as a variant, the exit surface of the primary optical component may form a projecting optical surface, in which case the luminous module is devoid of a secondary optical component separate from the primary optical component; and the projecting secondary optical component is formed by a mirror. This mirror may have an asphericized conical profile, or as a variant, a parabolic profile. Advantageously, the mirror may be grooved. Provision will also possibly be made for the projecting secondary optical component to be formed by a lens, or even one or more lenses and/or one or more mirrors.

It will be noted that the lighting module may have three surfaces for treating the geometric aberration of the light rays, two of which are borne by the primary optical component. The exit face of the light guides is placed in the plane of the admission surface of the corrective portion, which plane is coincident with an object focal plane of the projecting system formed by the primary and secondary optical components.

The position of the "exit plane" of the light guides (this "exit plane" designating the not necessarily planar surface over which the exits of the light guides extend) in the object focal plane of the projecting secondary optical component makes it possible to create, at infinity, an image of the secondary light sources at the exit of the light guides, thus producing luminous segments of corresponding shapes.

Provision will possibly be made for the three surfaces for treating geometric aberrations that a light ray sees in succession from the light guide to the exit of the lighting module to be a total-internal-reflection surface borne by the primary optical component, a refraction surface also borne by the primary optical component, and a second reflection surface formed by the projecting secondary optical component.

The invention furthermore relates to an automotive lighting system including at least one luminous module such as described above, and a controlling module for controlling the one or more light sources associated with this luminous module.

Preferably, the lighting system includes a module for detecting an obstacle present on the road and not to be dazzled. Thus whether a light source is turned on or off depends on whether such an obstacle is detected, so as for example to illuminate all of the road except for the obstacle.

The system may advantageously include a plurality of luminous modules according to the invention.

It will possibly be noted that, advantageously, the luminous module of the lighting system is arranged to produce a plurality of luminous bands, each band for example being formed by one of the light sources of the luminous module. The set of luminous bands produced by the system forms a luminous beam each of the bands of which may be turned on or off by turning the light source producing the band on or off, using the controlling module.

These and other objects and advantages of the invention will be apparent from the following description, the accompanying drawings and the appended claims.

BRIEF DESCRIPTION OF THE ACCOMPANYING DRAWINGS

Other features and advantages of the invention will become apparent on reading the following detailed description of one embodiment, in which description, to aid understanding, reference will be made to the appended figures, in which:

FIG. 1 is a perspective view of components of a lighting module, according to a first embodiment of the invention, namely primary and secondary optical components and a plurality of light sources placed facing the primary optical component;

FIG. 2 is a side view of the components of the lighting module in FIG. 1; and FIG. 3 is a cross-sectional view of the primary optical component such as illustrated in FIG. 1.

DETAILED DESCRIPTION OF THE PREFERRED EMBODIMENTS

In the following description, nonlimitingly, the longitudinal, vertical and transverse orientation adopted will be the orientation conventionally used in the automotive industry and indicated by the three axes L, V, T shown in FIG. 1.

Such as illustrated in the figures, a luminous module according to the invention and intended to equip an automotive vehicle headlamp, mainly includes a plurality of primary light sources 1, a primary optical component 2 and a projecting secondary optical component 4.

The primary light sources 1 are, in the particular example described here, light-emitting diodes. However, the light-emitting diodes could be replaced by other light sources, such as laser diodes.

The projecting secondary optical component 4 is here a convergent mirror, made from a material that has a reflective coating. It is placed and configured to project to infinity images formed on the focal plane 5, represented by the dashed line in FIG. 2, of the projecting system formed by the primary optical component 2 and the projecting secondary optical component 4 together.

The primary optical component 2 includes a corrective portion 6 and a light-entrance member that is associated with the primary light sources 1.

In the embodiment that will be explicitly described, the light-entrance member consists of a number N of light guides 8 associated with N primary light sources 1, respectively. The N light guides 8 are integrally formed with the corrective portion 6 so that they form an integral structure, i.e. these corrective portions 6 are not separable from one another without breakage. The use of light guides 8 allows more tolerance in the positioning of the primary light sources 1, which may be mounted on a common carrier (not shown here).

It will be understood that the light guides 8 and the corrective portion 6 will be manufactured from the same material or produced from the same polymer. By way of illustrative example, the light guides 8 may be manufactured from PMMA HT (high-temperature polymethyl methacrylate) of refractive index equal to 1.490 and resistant to high temperatures, and the corrective portion 6 made of less expensive PMMA 8N of refractive index equal to 1.491. The refractive indices are substantially the same so that, such as will be described below, light passing from the light guide 8 to the corrective portion 6 is not substantially deviated. In order to allow light rays to be transmitted, the material forming the light guides 8 and the corrective portion 6 is transparent. It is here a question of a material used to produce optical lenses, such as an organic material or even glass.

In the particular example described here, the number N of light guides 8 is equal to four. Of course, this number could be higher or lower than four. It is however preferably strictly higher than one, in particular when the lighting module of the invention is employed in an adaptive lighting system. The light guides 8 are here juxtaposed one after another to form a single horizontal row. As a variant, the light guides 8 could be juxtaposed pairwise.

Each light guide 8 has a substantially prismatic shape an entrance face 10 of which, through which the light enters, and an opposite exit face 12 of which, opening onto the corrective portion 6, form the rectangular bases. Each light guide 8 furthermore includes two lateral faces 14 that extend longitudinally and vertically, which faces are oriented toward the projecting secondary optical component 4, and two transverse faces that extend vertically and transversely, substantially parallel to the projecting secondary optical component 4, and among which an anterior transverse face 16 is further away from the projecting secondary optical component 4 than a posterior transverse face 18.

The entrance face 10 of each light guide 8 is here planar and it extends facing a primary light source 1, the distance between an exit plane of the primary light source 1 and the entrance face 10 of the associated light guide 8 advantageously being comprised between 0.1 millimeters and 1 millimeter. The light emitted by the primary light sources 1 is intended to propagate inside the light guide 8, from the entrance face 10 to the exit face 12, via successive total reflections from the internal walls of the anterior and posterior transverse faces 16, 18, in order to end up in the corrective portion 6 of the primary optical component 2. The exit faces 12 of the light guides 8, here rectangular, then constitute secondary light sources intended to produce respective light beams at the exit of the lighting module, after treatment of the light by the corrective portion 6. The faces may be a flat or curved shape, of any shape, and they are advantageously formed so as to produce a desired light-beam shape at the exit of the luminous module. By way of example, the lateral faces, and the anterior and posterior transverse faces 16, 18, will possibly be given planar or curved spreading shapes that will be shaped so as to enlarge the transverse cross section of the corresponding light guide 8, from its entrance face 10 to its exit face 12.

The anterior transverse face 16 is a right face whereas the posterior transverse face 18, such as may be seen in FIG. 3, is a curved face. The inclination of the anterior and posterior transverse faces 16, 18 one with respect to the other allows the size of the exit face 12 and therefore the image projected by the secondary light source to be dimensioned.

The corrective portion 6 is formed by a ball truncated by two sectioning surfaces. These sectioning surfaces intersect on a common edge 20 that extends inside the ball such that the center of the ball is located outside of the corrective portion 6. The two surfaces defined by these sectioning surfaces, and which extend from the common edge 20 to the outline of the ball, are inclined one with respect to the other by an angle of about 45°.

Thus, the corrective portion 6 has the shape of a ball portion bounded by three surfaces that will be called, with reference to their function such as will be explained in detail below, an admission surface 22, an intermediate surface 24 and an exit surface 26.

A first sectioning surface of the ball generates the admission surface 22, which is substantially planar and which forms an accommodation face for the light guides 8 added to and aligned with this admission surface 22. The admission surface 22 includes the exit faces 12 of the light guides 8. The distance separating the primary optical component 2 and the projecting secondary optical components 4 is strictly greater than zero and adapted so that the zone of junction of the exit faces 12 of the light guides 8 and the admission surface 22 coincides with the object focal plane 5 of the projecting system formed by the primary optical component 2 and the projecting secondary optical component 4. By virtue of this, the lighting module according to the invention, and its two primary and secondary optical components 2, 4, is suitable for creating an image at infinity of the secondary light sources formed at the exit face 12 of the light guides 8.

The second sectioning surface traces the outline of the intermediate surface 24 which, such as may be seen in FIG. 3, is curved toward the interior of the corrective portion 6. Specifically, in order to obtain total internal reflection of the rays from this intermediate surface 24, provision is made to curve this surface according to a polynomial equation, the parameters of which will depend for example on the size of the corrective portion 6, and on the angle between the admission surface 22 and the intermediate surface 24.

The equation could be the following:

$$z = -84.715\left(\frac{x}{100}\right)^2 + 14.211\left(\frac{y}{100}\right)^2 +$$
$$1324.046\left(\frac{x}{100}\right)^2\left(\frac{y}{100}\right) + 11.714\left(\frac{y}{100}\right)^3 + 2347.586\left(\frac{x}{100}\right)^4 -$$
$$3535.841\left(\frac{x}{100}\right)^2\left(\frac{y}{100}\right)^2 - 151.502\left(\frac{y}{100}\right)^4$$

The intermediate surface 24 is oriented so that the exit faces 12 of the light guides 8 are all turned toward this intermediate surface 24 so that all the light rays make contact with the total-reflection intermediate surface 24.

The exit surface 26 of the corrective portion 6 is formed by the exterior wall of the ball and is turned toward the mirror forming the projecting secondary optical component 4.

The various portions of the primary optical component 2 will now be functionally described with reference to the path of the rays illustrated in FIG. 3.

In operation, the light rays emitted by a primary light source 1 penetrate, at least partially, into the associated light guide 8 via its entrance face 10. These rays are channeled in the light guide 8 by successive total reflections and propagate inside the light guide 8 from its entrance face 10 to its exit face 12, possibly by successive reflections from the anterior and posterior transverse faces 16, 18 (which may be seen in the cross-sectional view in FIG. 3) or from the lateral faces.

At the interface between the exit face 12 of the light guide 8 and the admission surface 22 of the corrective portion 6, rays exiting the light guide 8 penetrate into the corrective portion 6 without being deviated. All of the rays are then directed with precision toward the internal-reflection surface so as to be reflected in the direction of the exit surface 26.

The admission surface 22 is shaped so that the "exit plane" portion over which the exit faces 12 of the light guides 8 extend is oriented toward the intermediate surface 24 so that rays exiting from the light guide 8 depart in the direction of this surface. Moreover, the rectangular shape of the exit face 12 of the light guide 8, and its dimensions, prevents rays exiting the light guide 8 from departing in a direction other than that leading to the polynomial reflection surface and they thus do not escape the intermediate internal-reflection step between the admission and exit of the rays in the corrective portion 6. Care is taken, when constructing the lighting module, to ensure that the end of the posterior transverse face 18 is level with the exit face 12 of the light guide 8 closest toward the corresponding end of the anterior transverse face 16 so that rays emitted by the diode and that strike the posterior transverse face 18 near the end of the anterior transverse face 16 without being deviated in the light guide 8 indeed propagate in the direction of the internal-reflection surface. Control of the scattering of the rays so as to target them on the internal-reflection surface is made easier by the absence of refraction between the light guides 8 and the corrective portion 6.

The rays are integrally reflected by the polynomial shape of the internal-reflection surface in the direction of the exit surface 26. The rays then follow straight lines toward the exit surface 26 of the corrective portion 6. Because the ball is centered on a virtual point corresponding to the image point of a secondary source, which point is obtained by symmetry with respect to the polynomial surface, the rays make contact with the exit surface 26 of the primary optical component 2 substantially normally to this spherical wall, and they are integrally refracted, without degradation of the image that they form, toward the projecting secondary optical component 4.

The rays are reflected by the mirror forming this projecting secondary optical component 4 so as to form, at infinity, images corresponding to those of the secondary light source, i.e. beams of parallel rays forming luminous segments of overall rectangular shape.

It will be understood that the corrective portion 6 bears two surfaces for decreasing the geometric aberrations of the light rays, namely the intermediate surface 24, which plays the role of a total-internal-reflection surface, and the exit surface 26, which plays the role of a refraction surface.

The above description clearly explains how the invention allows the objectives that were set therefor to be achieved and in particular how it allows a luminous module that facilitates the implementation of an effective adaptive lighting system to be provided.

Other variants may be implemented without departing from the scope of the invention, such as production of the light-entrance member from a plurality of guides optionally produced in integral form, or a plurality of micro-lenses.

It will be observed that, in the lighting module according to the invention, the light rays undergo in succession a total reflection, a refraction and a second reflection, it being understood that they also undergo an initial refraction on entering the light guides 8, and total reflections from the walls of the light guides 8.

The corrective portion 6, in cooperation with the light-entrance member, plays a dual role. On the one hand it allows the optical efficacy of the luminous module to be improved. The entrance face 10 of the light guides 8 has the effect of decreasing the aperture of the light rays emitted by the primary light sources 1, the rays penetrating into the light guides 8 being flattened by the laws of refraction. It is known that a light ray penetrating into an optical guide with an aperture α with respect to the normal to the entrance surface of this optical guide is flattened toward the longitudinal axis of the optical guide by the laws of refraction to an angle arcsin(1/n*sin(α)). Thus, the shape and dimensions of a secondary light source at the exit face 12 of each of the light guides 8 may be calibrated. Furthermore, at the interface between each light guide 8 and the corrective portion 6, the light rays are not deviated because of the connection between the light guides 8 and the corrective portion 6. By virtue of this, the small aperture of the rays is preserved, and it is possible to target the path of the rays toward the internal-reflection surface. The corrective portion 6 advantageously has a total-reflection intermediate surface between the admission and exit of the ball by refraction, in order to improve the treatment of the geometric aberrations of the light rays. Lastly, these light rays exiting from the corrective portion 6 via the exit surface 26 are not or not greatly deviated by virtue of the spherical dome shape of the exit surface 26, because the latter is centered on the image of the secondary source obtained by symmetry with respect to the internal-reflection surface.

The assembly formed by the diodes and the light guides 8 generates, at the exit face 12 of the light guides 8, rectangular lighting luminous segments that are then imaged to infinity using two reflective surfaces and a refraction surface. The two reflective surfaces allow good correction of optical aberrations so that it is possible then to form luminous segments of very finely controlled sharpness and shape in order to maximize the visibility on the road at night and comfort without dazzling other users. The fact that one of the two reflective surfaces is a dioptric surface working in total reflection allows losses due to reflection from this surface to be limited compared to what they would be if a mirror were used. Therefore, in this system comprising two reflective surfaces, a low level of losses, similar to the level that would be obtained if the system were composed only of a single mirror, is preserved. Advantageously, the lighting module according to the invention also includes a refraction surface formed by the exit surface 26 of the primary optical component 2, thereby furthermore participating in the correction of field aberrations. Therefore, with only two primary optical components 2 and in a relatively compact system, three optical surfaces for imaging the luminous segments are provided while preserving a level of losses that is relatively low for a mirror-based system, this type of system being preferred to a lens-based system for the aforementioned reasons, which include cost.

Thus, the luminous module of the invention has an excellent optical efficacy. The light flux emitted by the sources undergoes little loss and is almost entirely recovered as output from the light module to create light beams able to form luminous segments.

Furthermore, the luminous module may produce luminous segments the shapes of which are perfectly controlled. In particular, the vertical frontiers of the luminous segments have a well-controlled sharpness and shape.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A primary optical component for an automotive-vehicle lighting module, of a type including:
   at least one light-entrance member having a light-ray entrance face through which light rays issue; and
   a corrective portion joined, at a zone of junction, with said at least one light-entrance member, said corrective portion having a light-ray exit face and at least one intermediate surface, one or more of the light-ray exit face and the at least one intermediate surface having a profile that partially corrects a geometric aberration of light rays, the geometric aberration being one or more of a geometric aberration induced by reflecting from a projecting secondary optical component and/or a geometric aberration induced, prior to being incident on the at least one intermediate surface, on light rays issued through the light-entrance member into the corrective portion via the zone of junction, wherein
   said at least one light-entrance member and said corrective portion form an integral structure, and said corrective portion being bounded by at least three surfaces including an admission surface through which said light-entrance member opens onto said corrective portion via said zone of junction, said at least one intermediate surface, and an exit surface having a convex shape and including said light-ray exit face of said corrective portion, and said at least one intermediate surface forming a reflective surface arranged to reflect said light rays issued through said at least one light-entrance member, said reflected light rays being directed, after reflection, toward said light-ray exit face.

2. The primary optical component as claimed in claim 1, wherein said zone of junction of said at least one light-entrance member is oriented toward said at least one intermediate surface.

3. The primary optical component as claimed in claim 2, wherein said intermediate surface is planar.

4. The primary optical component as claimed in claim 1, wherein said exit surface of said corrective portion has a spherical shape on the whole, and a center of said spherical shape is located outside of said corrective portion.

5. The primary optical component as claimed claim 4, wherein said center of said spherical shape of said exit surface of said corrective portion is in a vicinity of an image of a center of said zone of junction, said image being a reflection of said center of said zone of junction through said intermediate surface.

6. The primary optical component as claimed in claim 1, wherein said intermediate surface has a curved shape convex interior of said corrective portion.

7. The primary optical component as claimed in claim 1, wherein said intermediate surface is planar.

8. The primary optical component as claimed in claim 1, wherein said intermediate surface and said zone of junction are inclined with respect to one another by an angle of about 45°.

9. The primary optical component as claimed in claim 1, wherein respective refractive indices of said at least one light-entrance member and said corrective portion are substantially identical.

10. The primary optical component as claimed in claim 1, wherein said at least one light-entrance member comprises a light guide, at least one of an upper face of said light guide and a lower face of said light guide having the shape of a portion of a cylinder.

11. A luminous module for an automotive vehicle wherein said luminous module comprises a primary optical component as claimed in claim 1, and at least one light source associated with said at least one light-entrance member of said primary optical component.

12. The luminous module as claimed in claim 11, wherein said luminous module comprises a plurality of light sources each associated with said primary optical component.

13. The luminous module as claimed in claim 11, wherein said primary optical component is placed facing said projecting secondary optical component, said zone of junction of said at least one light-entrance member with said admission surface being coincident with an object focal surface of a projecting system formed by said optical primary component and said projecting secondary optical component.

14. The luminous module as claim 13, wherein said projecting secondary optical component is formed by a mirror.

15. An automotive lighting system including at least one luminous module as claimed in claim 11, and a module for controlling said at least one light source associated with said luminous module.

16. The primary optical component as claimed in claim 1, wherein said intermediate surface has a curved shape that is convex interior of said corrective portion.

17. The primary optical component as claimed in claim 1, wherein the reflective surface is arranged to reflect, via total internal reflection, the rays issued from said at least one light-entrance member, the reflected rays being directed, after reflection, toward said exit surface.

18. The primary optical component as claimed in claim 1, wherein said geometric aberration of light rays is present in first light rays that are propagating from the admission surface toward the at least one intermediate surface, and said geometric aberration of light rays being reduced, relative to the first light rays, in second light rays that are propagating from the at least one intermediate surface toward the exit surface.

19. A primary optical component for an automotive-vehicle lighting module, of a type including:
at least one light-entrance member having a light-ray entrance face; and
a corrective portion having a light-ray exit face, wherein said at least one light-entrance member and said corrective portion form an integral structure, said corrective portion being bounded by at least three surfaces including
an admission surface through which said light-entrance member opens onto said corrective portion via a zone of junction,
at least one intermediate surface, and
an exit surface including said light-ray exit face of said corrective portion,
said at least one intermediate surface forming a reflective surface arranged to reflect rays issued from said at least one light-entrance member, the reflected rays being directed, after reflection, toward said exit surface, and
a center of a spherical shape of said light-ray exit face is in a vicinity of an image of a center of the zone of junction, the image being a reflection of the center of the zone of junction through the intermediate surface.

* * * * *